(12) United States Patent
Huang

(10) Patent No.: US 11,597,194 B2
(45) Date of Patent: Mar. 7, 2023

(54) STAMPING UNIT FOR PRESSING FOAMED MATERIAL ONTO SUBSTRATE

(71) Applicant: Shih-Ying Huang, Taipei (TW)

(72) Inventor: Shih-Ying Huang, Taipei (TW)

( * ) Notice: Subject to any disclaimer, the term of this patent is extended or adjusted under 35 U.S.C. 154(b) by 0 days.

(21) Appl. No.: 17/464,491

(22) Filed: Sep. 1, 2021

(65) Prior Publication Data

US 2021/0394499 A1    Dec. 23, 2021

Related U.S. Application Data

(63) Continuation-in-part of application No. 15/688,935, filed on Aug. 29, 2017, now abandoned.

(30) Foreign Application Priority Data

Sep. 10, 2016   (TW) ................... 105214026
Jan. 16, 2017   (TW) ................... 106200772

(51) Int. Cl.
| | | |
|---|---|---|
| *B32B 37/10* | (2006.01) | |
| *B32B 29/00* | (2006.01) | |
| *B32B 3/30* | (2006.01) | |
| *B32B 37/06* | (2006.01) | |
| *B29C 65/02* | (2006.01) | |

(Continued)

(52) U.S. Cl.
CPC ............. *B32B 37/10* (2013.01); *B26F 1/384* (2013.01); *B26F 1/40* (2013.01); *B26F 3/08* (2013.01); *B29C 65/02* (2013.01); *B32B 3/30* (2013.01); *B32B 5/18* (2013.01); *B32B 29/007* (2013.01); *B32B 37/0046* (2013.01); *B32B 37/04* (2013.01); *B32B 37/06* (2013.01); *B32B 38/0004* (2013.01); *B32B 38/10* (2013.01); *B32B 38/185* (2013.01); *B32B 2305/022* (2013.01); *B32B 2317/12* (2013.01)

(58) Field of Classification Search
CPC .. B32B 37/10; B32B 3/30; B32B 5/18; B32B 29/007; B32B 37/0046; B32B 37/04; B32B 37/06; B32B 38/0004; B32B 38/10; B32B 38/185; B32B 2305/022; B32B 2317/12; B26F 1/384; B26F 1/40; B26F 3/08; B29C 65/02
See application file for complete search history.

(56) References Cited

U.S. PATENT DOCUMENTS

2018/0009072 A1*  1/2018  Kittel .................. B23P 15/26

FOREIGN PATENT DOCUMENTS

DE        19515791 A  * 10/1996

OTHER PUBLICATIONS

DE19515791A Machine Translation of Description (Year: 2022).*

* cited by examiner

*Primary Examiner* — Cynthia L Schaller
(74) *Attorney, Agent, or Firm* — Chun-Ming Shih; HDLS IPR Services

(57) ABSTRACT

A tool for pressing a foamed material onto a substrate, a manufacturing apparatus thereof, and a method for manufacturing a laminated structure of a heat-retaining container are disclosed. The tool comprises a body, a blade portion extending in a lengthwise direction from the body, and a press portion extending in the lengthwise direction from the body and configured for pressing the foamed material onto the substrate. The tool may be used to press a foamed material sheet onto a paper substrate and form a tear line on the foamed material sheet at the same time to simplify the manufacturing process of the laminated structure of a heat-retaining container.

13 Claims, 12 Drawing Sheets

(51) Int. Cl.
*B26F 3/08* (2006.01)
*B32B 37/04* (2006.01)
*B32B 37/00* (2006.01)
*B32B 5/18* (2006.01)
*B32B 38/18* (2006.01)
*B32B 38/10* (2006.01)
*B32B 38/00* (2006.01)
*B26F 1/40* (2006.01)
*B26F 1/38* (2006.01)

STAMPING UNIT FOR PRESSING FOAMED MATERIAL ONTO SUBSTRATE

CROSS REFERENCE TO RELATED APPLICATIONS

This application is a continuation-in-part application of U.S. patent application Ser. No. 15/688,935, filed Aug. 29, 2017, the content of which is incorporated herein by reference in its entirety.

BACKGROUND

1. Technical Field

The present disclosure relates to heat-retaining containers, and, more particularly, to an apparatus and tool for preparing a laminated structure of a heat-retaining container.

2. Description of the Prior Art

With the development of science and technology, the demands for better quality of life have increased. In particular, not only the demands for better taste in food and beverage have increased, so do the demands for convenience of these foods, and hence the appearance of highly convenient fast food. In general, these ready-to-eat ("convenient") foods tend to use disposable containers, which would be thrown away by users after consumption. However, the containers used for holding the food generally have very poor heat insulation. At room temperature, food will lose its original temperature (cold or warm) fairly quickly. This may degrade or even deteriorate its flavor.

In the early days, in order to maintain the original flavor of the convenient fast-food products, foamed materials with better heat-retaining effect such as Styrofoam were used as the material of the disposable container for fast food. However, Styrofoam is extremely energy-consuming and not environmentally friendly in terms of production.

For this reason, a foamed material made of expanded polystyrene is now usually formed on the outside of a paper container body to produce a heat-retaining paper container.

As shown in FIG. 1, a conventional heat-retaining paper container 1 includes a paper container body 10 having a waterproof layer 100 therein, an adhesive layer 11 formed on an outer surface of the paper container body 10, and a foamed material 12 adhered to the paper container body 10 via the adhesive layer 11 such that the conventional heat-retaining paper container 1 has a heat-retaining effect.

There are typically two ways for making heat-retaining paper containers. One is to adhere an insulation material on the outside of the paper container to achieve the heat-retaining effect. Another approach is to coat the paper container with a material to be foamed and then the material is expanded (foamed) to obtain an insulation paper container with a heat-retaining material.

Considering the thickness of the foamed material or the foaming condition, if the foamed material is formed on the entire surface of a semi-finished paper container, it is necessary to design a different insulation container processing machine separate from the existing paper container processing machine. Therefore, in the conventional process of making heat-retaining containers, paper containers are first formed, and the foamed material is adhered to the paper container.

Therefore, there is a need in the industry for manufacturing heat-retaining paper containers using a standard paper container processing machine.

SUMMARY

In view of the aforementioned shortcomings of the prior art, the present invention provides a tool for pressing a foamed material onto a substrate, an apparatus for manufacturing a laminated structure of a heat-retaining container, and a method for manufacturing a laminated structure of a heat-retaining container to simplify the process of preparing a laminated structure for making a heat-retaining container.

The tool may include: a body; a blade portion extending in a lengthwise direction from the body; and a press portion extending in the lengthwise direction from the body and configured for pressing the foamed material onto the substrate.

In an embodiment, the press portion has a width between 0.5 mm and 20 mm. In another embodiment, the blade portion has a width between 0.1 mm to 2 mm.

In an embodiment, the blade portion and the press portion each include a distal end away from the body, with a gap formed between the two distal ends. In another embodiment, the gap is between 0.5 mm to 10 mm. In yet another embodiment, the gap is between ¼ and 2 times a thickness of the foamed material.

In an embodiment, the press portion is integrally formed with the body.

In an embodiment, the press portion includes a beveled or curved face extending from the distal end of the press portion towards the body.

In an embodiment, the blade portion has a first ring structure, and the press portion is configured inside the first ring structure and has a second ring structure.

In an embodiment, the press portion includes a serrated face at the distal end of the press portion.

The present invention further provides an apparatus for manufacturing a laminated structure of a heat-retaining container, which may include: a transport unit configured for supporting and transporting a paper substrate and a foamed material sheet placed on the paper substrate, and a stamping unit. The stamping unit includes a tool according to the present invention disposed above the transport unit, and a heater configured for heating the tool. The press portion and the blade portion face the foamed material sheet. The press portion is configured to contact a part of the foamed material sheet to press a foamed laminate onto the paper substrate, and the blade portion is configured to contact a surrounding of the part of the foamed material sheet to cut the foamed material sheet by melting.

In an embodiment, the apparatus further comprises a winding unit disposed at a downstream side in a transport direction of the transport unit, and configured for removing a rest part of the foamed material sheet not pressed onto the paper substrate.

In an embodiment, the apparatus further comprises a cutting unit disposed at a downstream side in a transport direction of the transport unit, and configured for cutting the paper substrate to obtain the laminated structure, with the foamed material laminate partially adhered to a central region of the laminated structure.

In an embodiment, the tool further includes a second press portion configured for contacting a part of the foamed material sheet to press a foamed laminate onto the paper substrate.

In an embodiment, the stamping unit is a planar die-cutting machine or a rotary die-cutting machine.

The present disclosure further provides a laminated structure for making a heat-retaining container, which may include: a paper-based layer defined with a central region and a peripheral region surrounding the central region at a periphery of the paper-based layer; a polymer layer at least formed in the central region and on a surface of the paper-based layer in proximity to the peripheral region; and a foamed sheet partially adhered on the central region of the paper-based layer, wherein the foamed sheet in the central region near the peripheral region is bonded to the polymer layer.

In an embodiment, the peripheral region includes a rolling portion and a bottom edge portion opposite to each other, and a first overlapping portion and a second overlapping portion opposite to each other, and the first overlapping portion and the second overlapping portion are connected to two ends of the rolling portion and the bottom edge portion, respectively.

In an embodiment, the laminated structure further comprises a leveling component formed at a joint area between the rolling portion and the second overlapping portion. In another embodiment, the leveling component is formed of a foamed material. In yet another embodiment, the laminated structure for making a heat-retaining container may include a leveling component formed at a joint area between the rolling portion and the second overlapping portion.

In an embodiment, a gap is formed at an area where the rolling portion and the second overlapping portion are adjacent to each other, such that when the first and second overlapping portions are overlapped, a portion of the first overlapping portion connected with the rolling portion does not overlap with the second overlapping portion.

In an embodiment, the foamed sheet has a flat edge.

In an embodiment, the foamed sheet has an open-bubble structure at an edge thereof.

In an embodiment, the foamed sheet contains the same material as the polymer layer.

Since the cutting tool structure according to the present disclosure includes both a blade portion and a suppressing portion, the foamed sheet is allowed to be cut while pressure and heat are applied thereto, so it is bonded with the polymer layer.

In the laminated structure for making a heat-retaining container according to the present disclosure, by partially adhering the foamed sheet onto the central region of the paper-based layer, the peripheral region of the laminated structure for making a heat-retaining container only has the thickness of the paper-based layer itself or plus the thickness of the polymer layer, so the heat-retaining container is not affected by the thickness of the foamed sheet, and can be processed by a standard paper container processing machine. Moreover, as the foamed sheet is only partially adhered onto the paper-based layer, when the container is being recycled, the foamed sheet can be easily peeled off to facilitate the separation process.

Furthermore, the leveling component such as a foamed material is provided at an area where the rolling portion is connected with the second overlapping portion, so that when overlapping and rolling processes are subsequently carried out by a paper container processing machine, the heat of the processing will lightly melt or soften the leveling component, which overflows beyond the intersection of the rolling portion and the first and second overlapping portions, thereby avoiding thickness difference at the overlapping area in a conventional paper container.

The present disclosure also provides the formation of a gap at an area where the rolling portion and the second overlapping portion are adjacent to each other, thereby avoiding thickness difference at the overlapping area in a conventional paper container.

In summary, the laminated structure for making a heat-retaining container of the present disclosure not only can be applied to a traditional paper container processing machine, but also facilitates separation of the paper container body and the foamed sheet as it is only partially adhered to the body at the edge, thereby increasing convenience in resource recycling. In addition, the heat-retaining paper container of the present disclosure also includes a specially-designed rolling portion, which improves sealing of liquid in the container.

In another aspect, the present invention features a method for manufacturing a laminated structure of a heat-retaining container. The method comprises contacting a foamed material sheet placed on a paper substrate with a tool of the invention, and moving the tool downward towards the paper substrate to press a foamed material laminate onto the paper substrate. The tool is heated to a temperature enough to press the foamed material laminate onto the paper substrate by the press portion as well as to cut the foamed material sheet by melting by the blade portion.

In one embodiment, the blade portion has a first ring structure, and the press portion is configured within the first ring structure and the press portion has a second ring structure.

To press the foamed material laminate onto the paper substrate, a tool of the present invention is moved downward towards the paper substrate, and press the contacting part of the foamed material sheet towards the paper substrate.

Conventionally, a cutting tool must be moved downward towards the paper substrate by a distance larger than a thickness of the foamed material sheet to efficiently cut the foamed material sheet because of the compressibility of foamed material, and this will damage the paper substrate and would adversely affect the following process of making a heat-retaining container.

However, in the present invention, with the heating of the tool, the tool is moved downward towards the paper substrate by a distance equal to a thickness of the foamed material sheet to effectively press the foamed material laminate onto the paper substrate as well as to cut the foamed material sheet by melting, without damaging the paper substrate below.

According to certain embodiments of the present invention, the tool is heated to a temperature ranging from 100 to 180° C. More specifically, the temperature may range from 100 to 150° C. for PE foam, and the temperature may range from 120 to 180° C. for PP foam.

In still another aspect, the present invention provides a laminated structure of a heat-retaining container prepared by a method as described above. The laminated structure comprises a paper substrate, and a foamed material laminate partially adhered to the paper substrate.

In one embodiment, the foamed material laminate is adhered a central region of the paper substrate.

Notably, a laminated structure prepared by a method of the present invention has a characteristic structure, namely, a protrusion formed at a periphery of the foamed material laminate.

BRIEF DESCRIPTION OF THE DRAWINGS

The present disclosure can be more fully understood by reading the following detailed description of the preferred embodiments, with reference made to the accompanying drawings, wherein:

FIGS. 2A-1 to 2D are schematic diagrams illustrating an embodiment of a tool according to the present disclosure, wherein FIG. 2A-1 is a schematic diagram of an embodiment of the tool according to the present disclosure, FIG. 2A-2 is a cross-sectional view taken along a cross-sectional line 2A-2A in FIG. 2A-1, FIGS. 2C-1 and 2C-2 are schematic diagrams of another embodiment of the tool according to the present disclosure, and FIG. 2D is a cross-sectional view taken along a cross-sectional line 2D-2D in FIG. 2A-1;

FIGS. 3A to 3B' are schematic diagrams illustrating another embodiment of a tool according to the present disclosure, wherein FIG. 3A is an isometric view of the tool according to the present disclosure, FIG. 3B is a cross-sectional view taken along a cross-sectional line 3B-3B in FIG. 3A, and FIG. 3B' is a schematic diagram of another embodiment according to the tool of the present disclosure;

FIGS. 5A to 5C are cross-sectional views of the apparatus for manufacturing a laminated structure of a heat-retaining container according to the present disclosure, wherein FIG. 5B is a cross-sectional view of a stamping unit of the apparatus for manufacturing a laminated structure of a heat-retaining container according to the present disclosure, and FIG. 5C is a cross-sectional view of a winding unit of the apparatus for manufacturing a laminated structure of a heat-retaining container according to the present disclosure;

FIGS. 6A and 6B are schematic views of an embodiment of a stamping unit of an apparatus for manufacturing a laminated structure, wherein FIG. 6B is another embodiment of a stamping unit of an apparatus for manufacturing a laminated structure:

FIGS. 7A and 7B are schematic views of an embodiment of a laminated structure for making a heat-retaining container according to the present disclosure, wherein FIG. 7B is a cross-sectional view taken along a cross-sectional line 7B-7B in FIG. 7A;

FIGS. 8A and 8B are schematic views of another embodiment of a laminated structure for making a heat-retaining container according to the present disclosure, wherein FIG. 8B is a cross-sectional view taken along a cross-sectional line 8B-8B in FIG. 8A; and FIGS. 9A and 9B are schematic views of yet another embodiment of a laminated structure for making a heat-retaining container according to the present disclosure, wherein FIG. 9B is a cross-sectional view taken along a cross-sectional line 9B-9B in FIG. 9A.

DETAILED DESCRIPTION OF THE EMBODIMENTS

Figure 1:
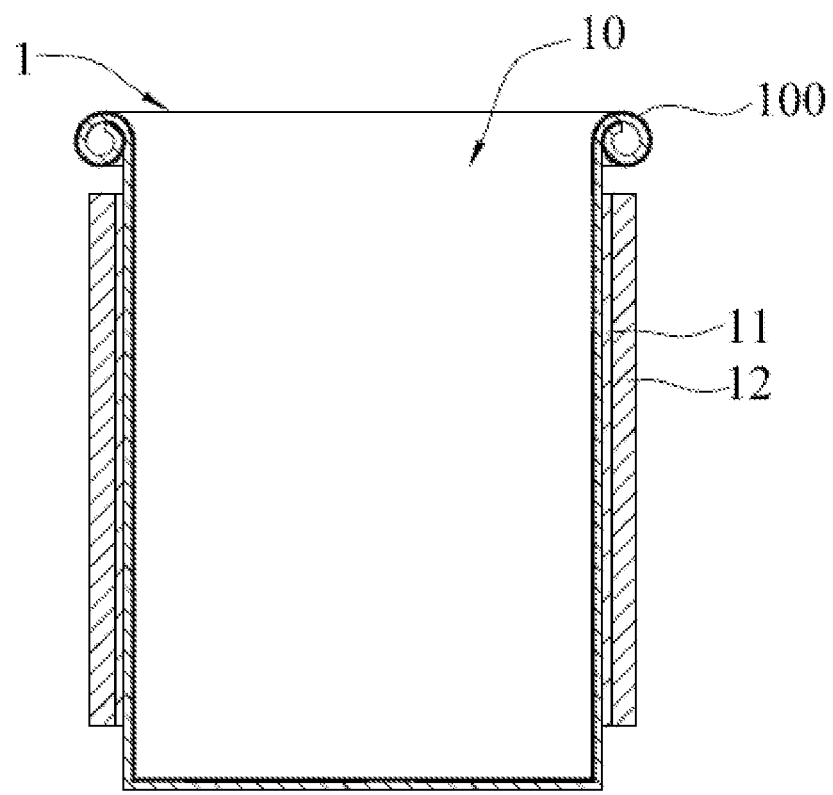
FIG. 1 is a cross-sectional view of a conventional heat-retaining paper container.

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "up", "down", "bottom", "first", "second", "a", "one" and the like, are for illustrative purposes only, and are not meant to limit the range implementable by the present disclosure. Any changes or adjustments made to their relative relationships, without modifying the substantial technical contents, are also to be construed as within the range implementable by the present disclosure.

Referring to FIGS. 2A-1, 2A-2, 2B, 2C-1, 2C-2, 2D and 3, tools 2A, 2B, 2C-1, 2C-2, 3 and 3' for pressing a foamed material onto a substrate include: a body 20, 20' and 30, respectively; a blade portion 21, 21', 21" and 31', respectively, extending in a lengthwise direction from the body 20, 20' and 30, respectively; and a press portion 22, 22' and 32, respectively, for pressing the foamed material onto the substrate, extending in the lengthwise direction from the body 20, 20' and 30, respectively.

Figures 1, 2A:
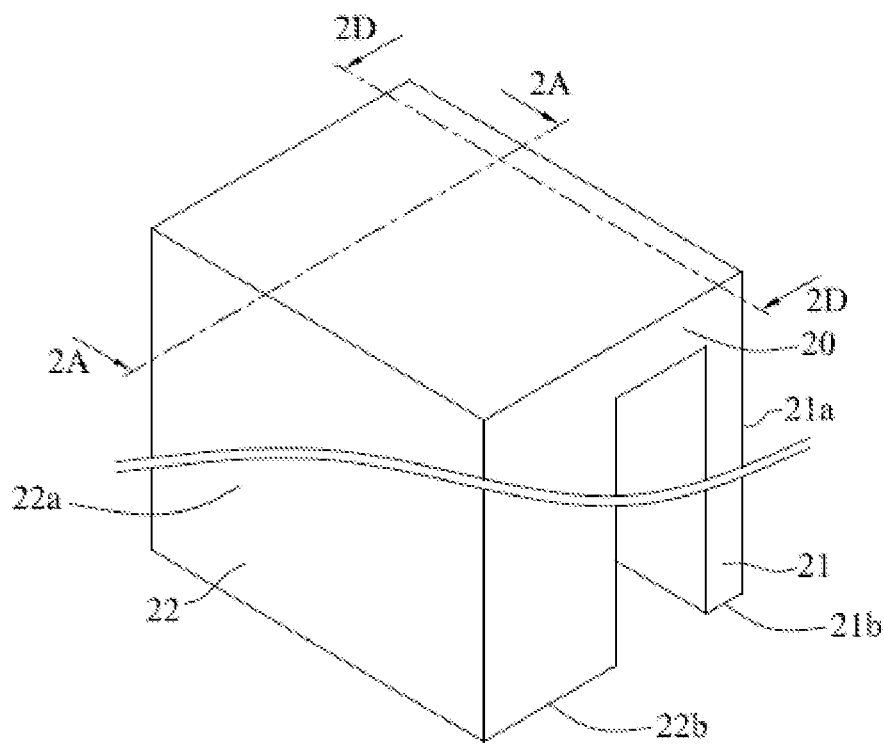

In an embodiment shown in FIG. 2A-1, the press portion 22 is a flat cuboid having a side face 22a and a press face 22b that will come into contact with the substrate. The press face has a width d1, and the blade portion 21 is a sheet-like body with a side face 21a and a cutting face 21b that will come into contact with the substrate. The cutting face 21b has a width d2. In an embodiment, the blade portion 21 and the press portion 22 are spaced apart. For example, the blade portion 21 and the press portion 22 each has a distal end away from the body 20, and there is a gap G between the two distal ends. The width d3 of the gap is from 0.5 to 10 mm. In an embodiment of the present disclosure, the width d3 of the gap G is between ¼ and 2 times the thickness of the foamed material.

Figures 2, 2A:
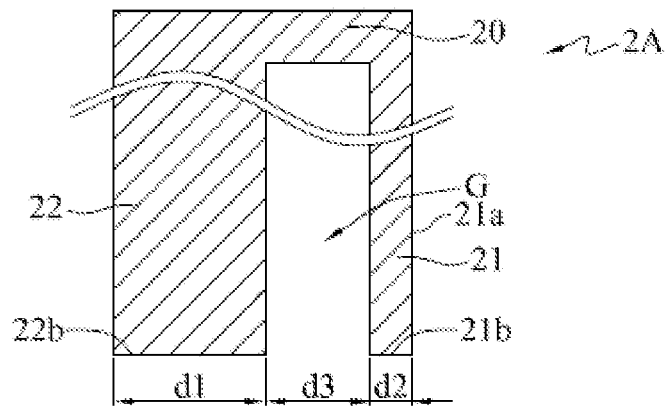
Figure 2B:
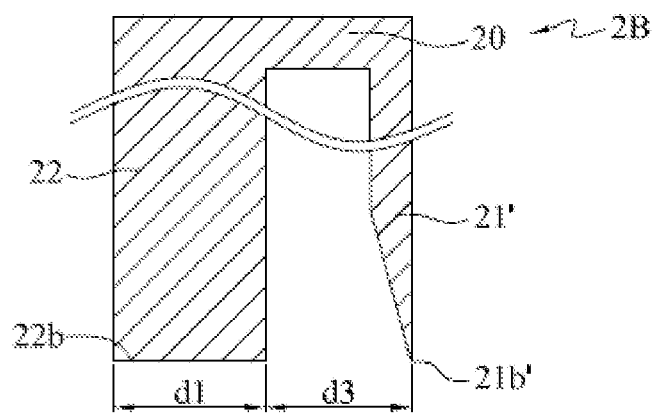
FIG. 2B is a schematic diagram of another embodiment of the tool according to the present disclosure.

In an embodiment shown in FIG. 2B, the blade portion 21' of the tool 2B forms a sharp knife edge at the distal end, i.e., at the corresponding cutting face 21b' of the blade portion 21'.

Figures 1, 2C:
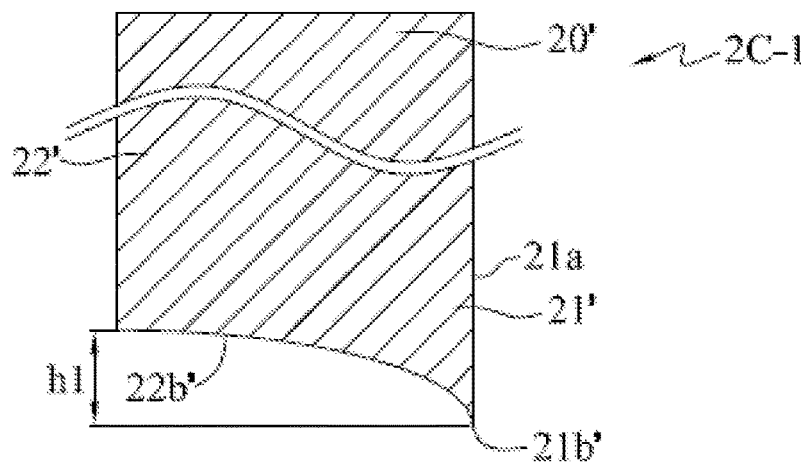
Figures 2, 2C:
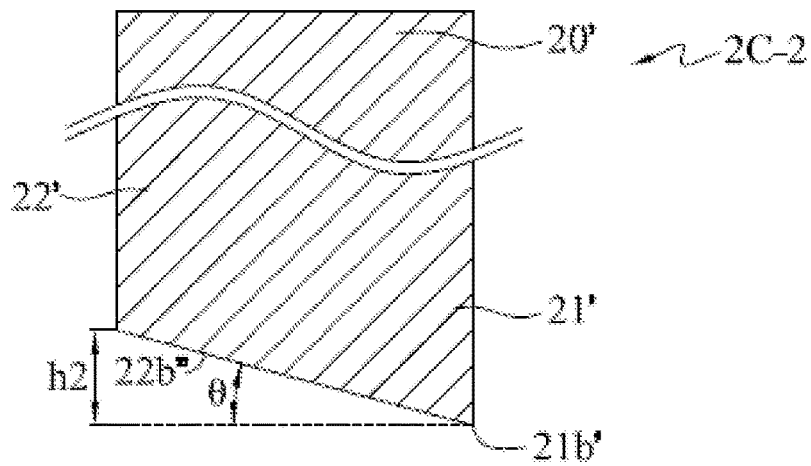

In accordance with an embodiment of the present disclosure, the press portion and the blade portion of the tool are formed extending in a lengthwise direction (i.e., downwards in the diagram) from the body. The press portion may include a beveled or curved face at its distal end. For example, as shown in FIGS. 2C-1 and 2C-2, the blade portion 21' has a distal end away from the body 20', and the press portion 22' has a beveled or curved face extending in a direction from its distal end towards the body 20'. The press portion 22' and the blade portion 21' have no gap between them. The press face 22b' is a curved face or a concave face as shown in FIG. 2C-1; and the press face 22b' is a beveled face as shown in FIG. 2C-2. In an embodiment, when the press face 22b' is a curved face or a concave face, the distal end of the blade portion 21' and a top of the press face 22b' have a height difference h1, which is less than the thickness of the foamed material. In an embodiment, the minimum of the height difference h1 is 80%, 70% or even 60% of the thickness of the foamed material.

In an embodiment, when the press face 22b is a beveled face, an angle θ included by the beveled face and the horizontal plane of the foamed material is from greater than 0° to 45°, preferably between 15° to 20°. In addition, the distal end of the blade portion 21' and the top of the press face 22b' have a height difference h2, which is less than the thickness of the foamed material. In an embodiment, the minimum of the height difference h2 is 80%, 70% or even 60% of the thickness of the foamed material.

Figure 2D:
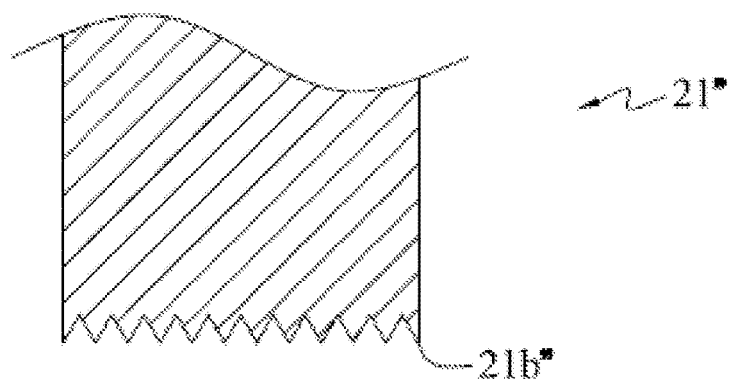

In another embodiment of the present disclosure as shown in FIG. 2D, the blade portion includes a serrated face at its distal end, that is, the blade portion is a serrated blade; in other words, when taken along a cross-sectional line 2D-2D of FIG. 2A-1, the knife edge of the blade portion 21' is serrated.

Figure 3A:
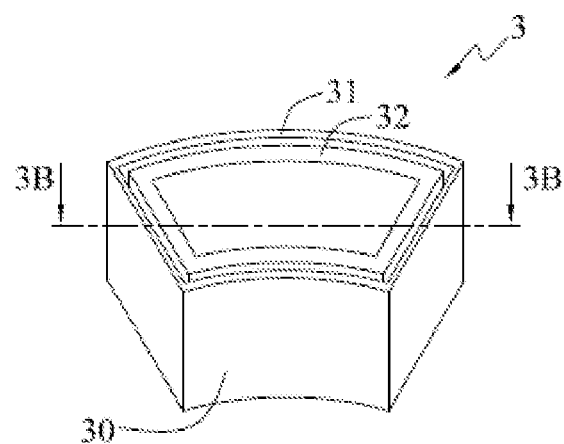
Figure 3B:
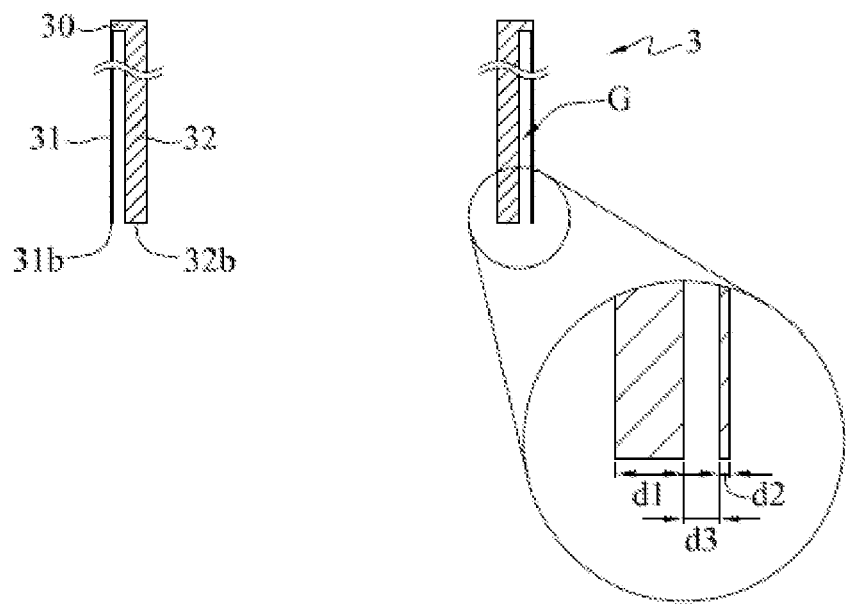
Figure 3B:
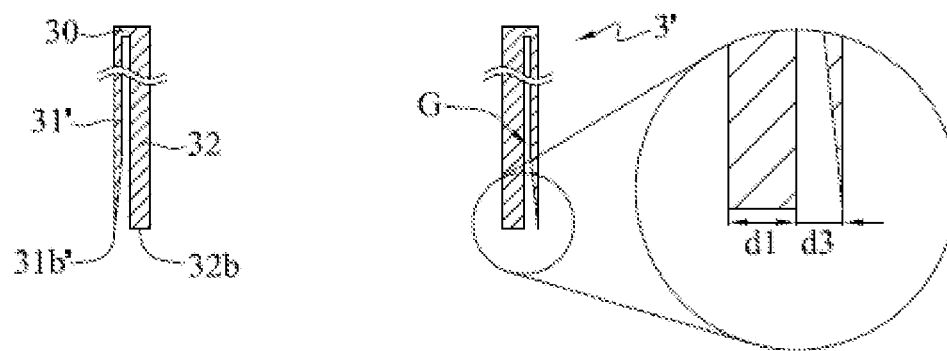

Referring to FIGS. 3A to 3B', FIG. 3A is an isometric upside down view of the tool 3 of the present disclosure. In the present embodiment, the blade portion 31 has a first ring structure, and the press portion 32 is configured inside the enclosed first ring structure, and the press portion 32 has a second ring structure.

In FIG. 3B, which is taken from a cross-sectional line 3B-3B in FIG. 3A, there is a gap G between the distal ends of the blade portion 31 and the press portion 32.

In an embodiment of the present disclosure, the width d1 of the press portion 22, 32 is between 0.5 and 20 mm, and the width d2 of the blade portion 21, 22 is between 0.1 and 2 mm, and the width d3 of the gap G between distal ends of the blade portion 22, 31 and the press portion 22 and 32, respectively, is between 0.5 and 10 mm. In a preferred embodiment, the width d1 of the press portion 22, 32 is between 2 and 2.5 mm, the width d2 of the blade portion 21, 22 is between 0.2 and 0.3 mm, the width d3 of the gap G between distal ends of the blade portion 22, 31 and the press portion 22 and 32, respectively, is between 0.5 and 1.5 mm.

In an embodiment of the tool of the present disclosure, the press portion and the body are integrally formed.

Furthermore, since the tool according to the present disclosure is designed for foamed materials with certain thicknesses, when a gap G exists between the press portion 22, 32 and the blade portion 21, 31, the width of the gap G is defined in terms of the thickness of the foamed sheet. In another embodiment, the gap between the blade portion 21, 31 and the press portion 22, 32, respectively, is between ¼ and 2 times the thickness of the foamed material. When no gap exists between the press portion 22' and the blade portion 21', a height difference exists between the press face 22b', 22b'' of the press portion 22' and the distal end of the blade portion 21', and is also defined in terms of the thickness of a foamed material sheet. For example, the minimum of the height difference is 80%, 70% or even 60% of the thickness of a foamed material.

In an embodiment, the tool according to the present disclosure may further include another press portion (not shown) for pressing a foamed material sheet onto a paper substrate in order to form various patterns.

Figure 4:
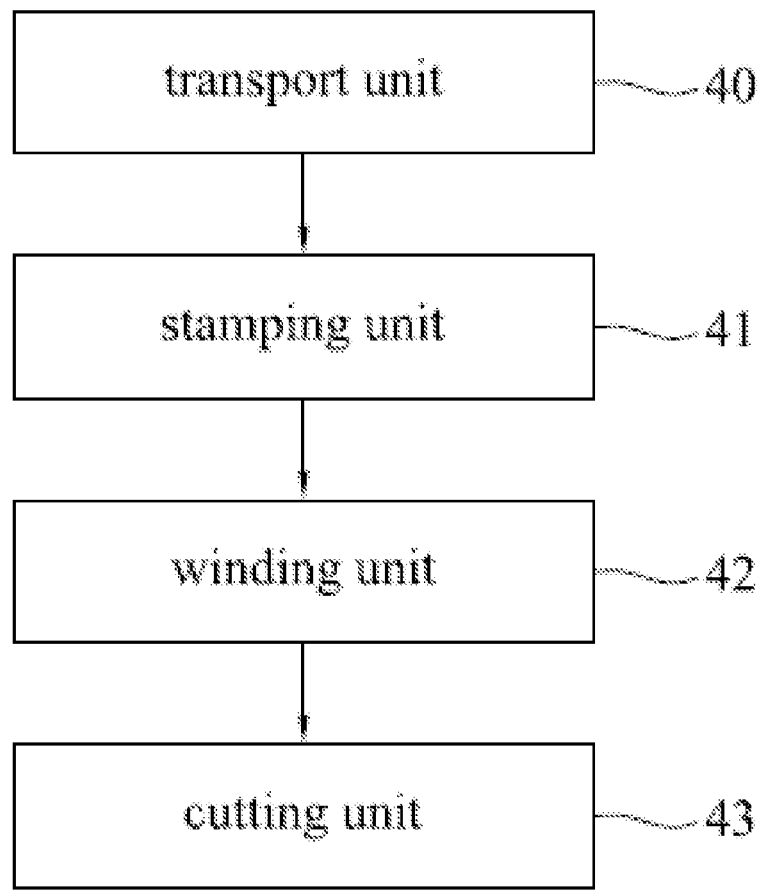
FIG. 4 is an operational flow of an apparatus for manufacturing a laminated structure of a heat-retaining container according to the present disclosure.
Figure 5A:
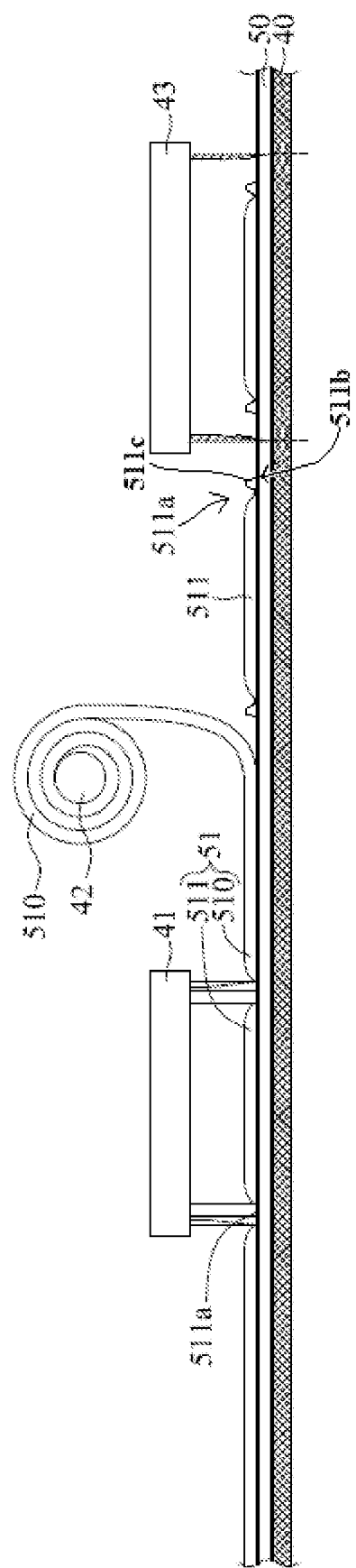

Referring now to FIGS. 4 and 5A, an operational flow of an apparatus for manufacturing a laminated structure of a heat-retaining container according to the present disclosure is explained. A transport unit 40 supports and transports a foamed material sheet placed on the paper substrate. Then, a stamping unit 41 equipped with any of the tools 2A, 2B, 2C-1, 2C-2, 3, 3' described with respect to FIGS. 2A to 3B' presses a foamed material laminate onto the paper substrate. In an embodiment, the tool 2A, 2B, 2C-1, 2C-2, 3, 3' includes a press portion 22, 22', 32 and a blade portion 21, 21', 21'', 31 adjacent the press portion 22, 22', 32, and the press portion 22, 22', 32 and the blade portion 21, 21', 21'', 31 face the foamed material sheet 51, so that the press portion 22, 22', 32 contacts a part 511a of the foamed material sheet 51 and presses a foamed material laminate 511 onto the paper substrate 50. The blade portion 21, 21', 21'', 31 is configured to contact a surrounding 511b of the part 511a of the foamed material sheet 51 to cut the foamed material sheet 51 by melting. A winding unit 42 such as a roller is used for recovering/removing a rest part 510 of the foamed material sheet 51 that is not pressed onto the paper substrate 50, such that the foamed material laminate 511 pressed onto the paper substrate 50 is separated from the rest part 510. Finally, a cutting unit 43 having, for example, a cutting knife, is used for cutting off a part of the paper substrate 50 along with the foamed material laminate 511 adhered thereto from the rest of the paper substrate 50, thereby obtaining a laminated structure of paper with a foam laminate thereon.

In an embodiment, the transport unit 40 can be a conveyor belt or other machine that can independently or individually support and transport the paper substrate 50 and the foamed material sheet 51 placed on the paper substrate 50. In an embodiment, the winding unit 42 and the cutting unit 43 are sequentially disposed at a downstream side in a transport direction of the transport unit 40, wherein the cutting unit 43 can be integrated with the stamping unit 41. In an embodiment, in addition to the tool described above, the stamping unit 41 further includes a cutting mold (not shown) that has a third ring structure surrounding the first ring structure of the blade portion of the tool. In another embodiment, the cutting unit 43 can be separately disposed downstream to the stamping unit 41 and the winding unit 42.

In an embodiment, the paper substrate is a sheet of paper with polymer layers (e.g., waterproof layers) formed on its surfaces (two surfaces) as shown by the thicker line in the diagrams.

Figure 5B:
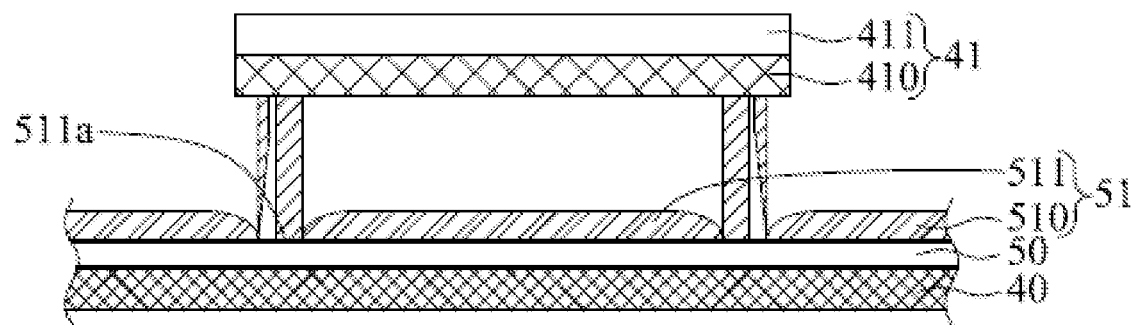

Referring to FIG. 5B, a cross-sectional view of the stamping unit 41 according to the present disclosure is shown. The stamping unit 41 includes one of the tools 2A, 2B, 2C-1, 2C-2, 3, 3' described with respect to FIGS. 2A to 3B'. The stamping unit 41 is used for pressing a foamed material laminate 511 onto the paper substrate 50.

Preferably, in addition to the tool 410, the stamping unit 41 further includes a heater 411 for heating the tool, which facilitates the forming of a tear line on the foamed material sheet 51 when the foamed sheet 51 and the paper substrate 50 are thermally pressed and laminated together. In an embodiment, the heat can be directly or indirectly provided. In an embodiment, the tool is equipped at a welding terminal of an ultrasonic welding machine. In another embodiment, a blade in a high frequency cutting machine or an ultrasonic cutting machine is replaced by the tool 410 according to the present disclosure to facilitate the pressing of the foamed sheet. In an embodiment, the stamping unit 41 is a planar die-cutting machine.

More specifically, the tool 2A, 2B, 2C-1, 2C-2, 3, 3' includes the press portion 22, 22', 32 and the blade portion 21, 21', 21'', 31 adjacent the press portion 22, 22', 32, wherein the press portion 22, 22', 32 is used for pressing the foamed material laminate 511 onto the paper substrate 50, and the blade portion 21, 21', 21'', 31 is used for contacting a surrounding 511b of the part 511a of the foamed material sheet 51 to cut the foamed material sheet 51 by melting (by melting the foamed material sheet 51 or breaking gas pockets therein), so as to form a tear line at the surrounding 511b between the foamed material laminate 511 and the rest part 510 of the foamed material sheet 51.

Figure 5C:
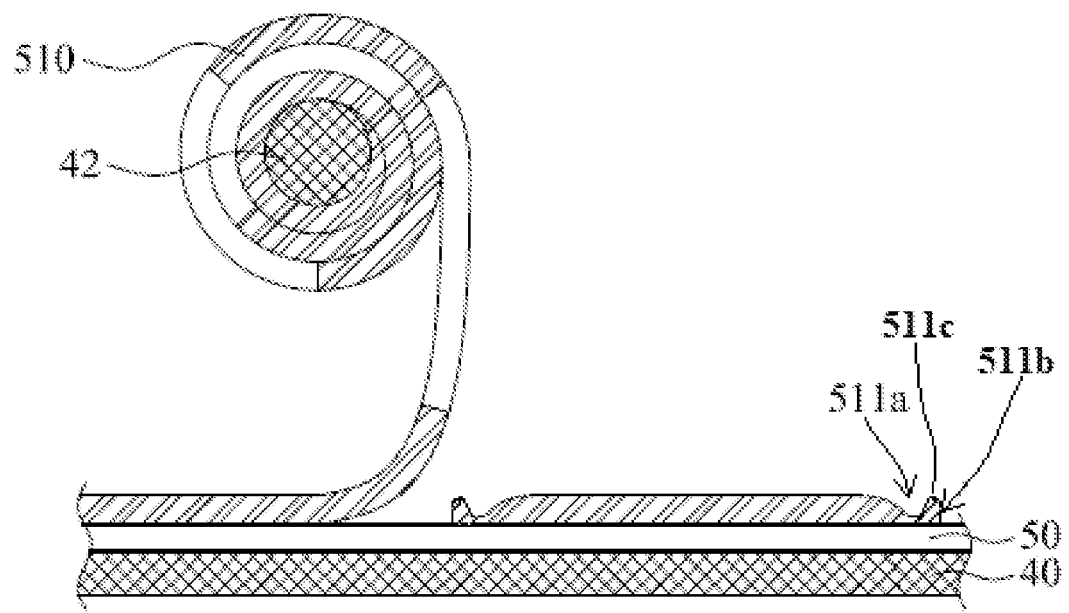

A cross-sectional view of the winding unit 42 according to the present disclosure is shown in FIG. 5C. The winding unit 42 is used for recovering/removing a rest part 510 of the foamed material sheet that is not pressed onto the paper substrate 50, and at the same time separating rest part 510 from the foamed material laminate 511 pressed onto the paper substrate 50.

In an embodiment, as the stamping unit 41 of the present disclosure (referring to FIG. 5B) has formed a tear line in advance at the surrounding 511b between the foamed material laminate 511 and the rest part 510, so when the winding unit 42 is removing the rest part 510 from the foamed material laminate 511, it can be easily torn off.

In another embodiment, the stamping unit is a rotary die-cutting machine. For example, the stamping unit stamps in a rolling and die-cutting manner.

Figure 6A:
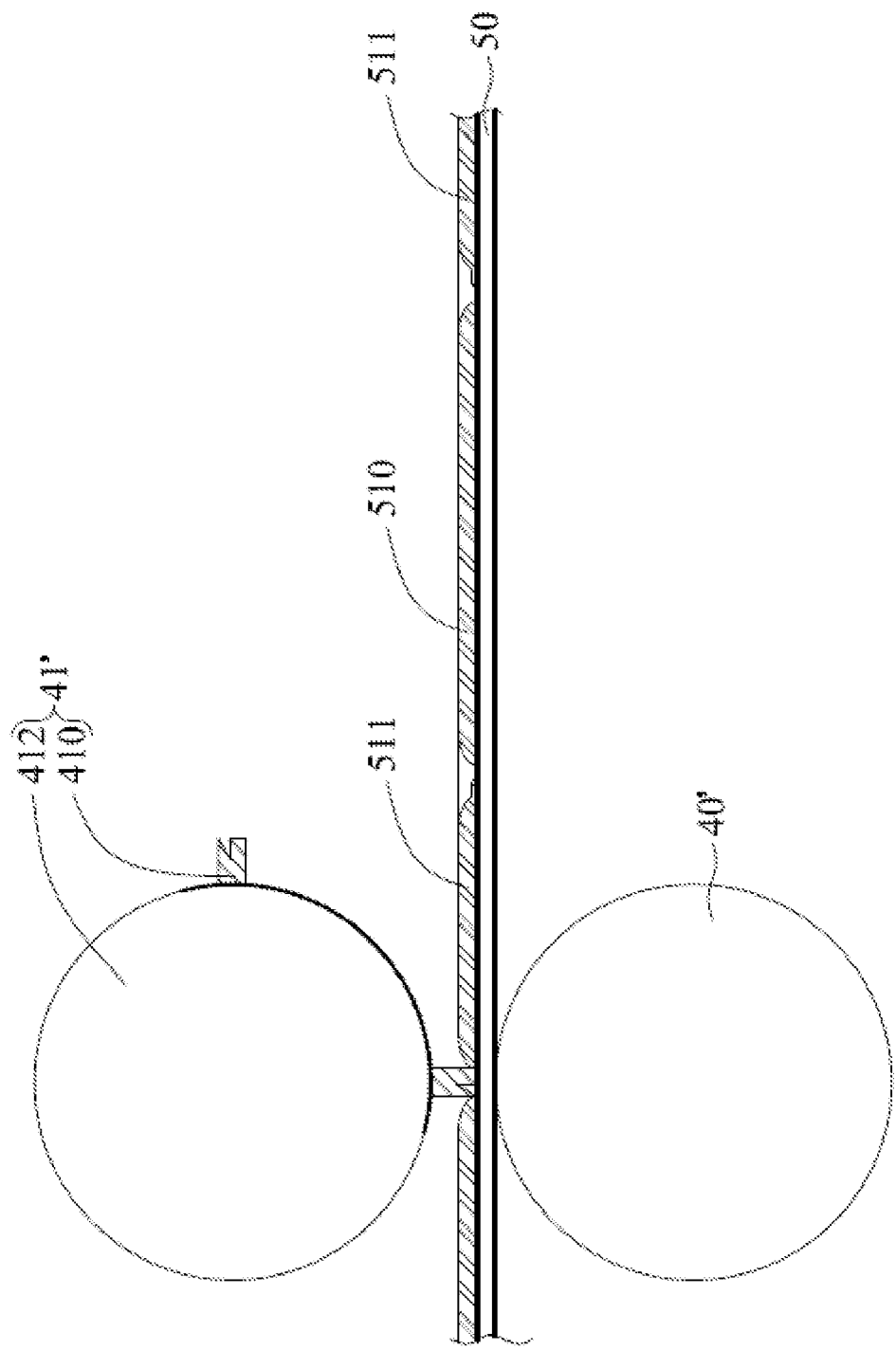
Figure 6B:
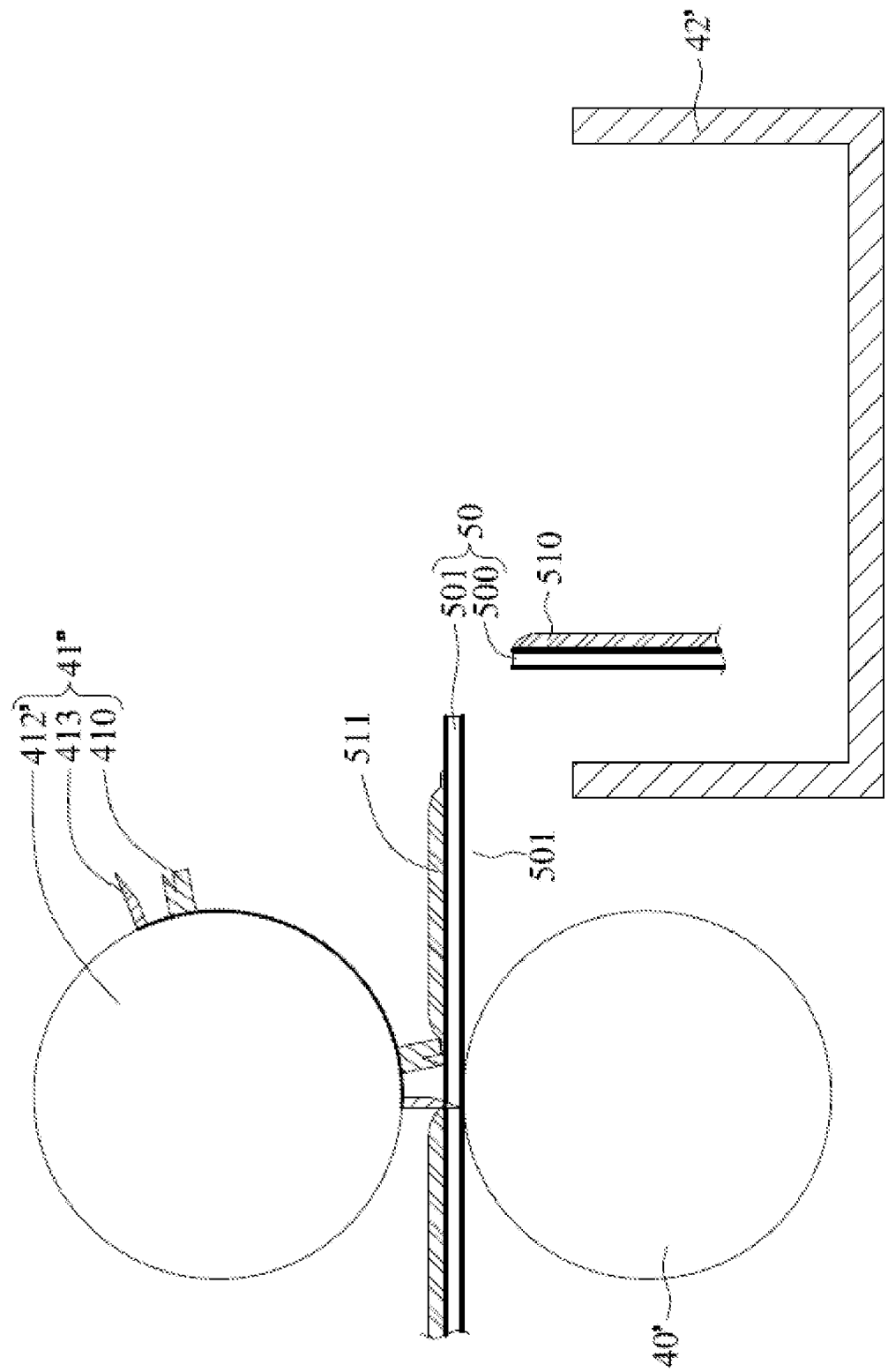

In an embodiment, referring to FIGS. 6A and 6B, which are cross-sectional views of stamping units 41' and 41" according to the present invention, respectively, the stamping units 41' and 41" have oppositely disposed first rollers 412, 412', a second roller 40' and a tool 410, which can be one of the tools 2A, 2B, 2C-1, 2C-2, 3 and 3' as shown in FIGS. 2A to 3B'. The tool 410 is disposed on the first rollers 412, 412', and the stamping units 41' and 41" roll and laminate a portion of the foamed sheet 511 onto the paper substrate 50. In another embodiment shown in FIG. 6B, a cutting knife 413 is further included. The cutting unit and the tool 410 are integrated to obtain the stamping unit 41", and, though a molding process, obtain a laminated structure including the paper substrate 501 and the foamed sheet 511 that is used to manufacture a heat-retaining container. Finally, the embodiment shown in FIG. 6B further comprises a collector 42' configured for collecting the remaining paper substrate 50 and foamed sheet 510 cut by the cutting unit.

Figure 7A:
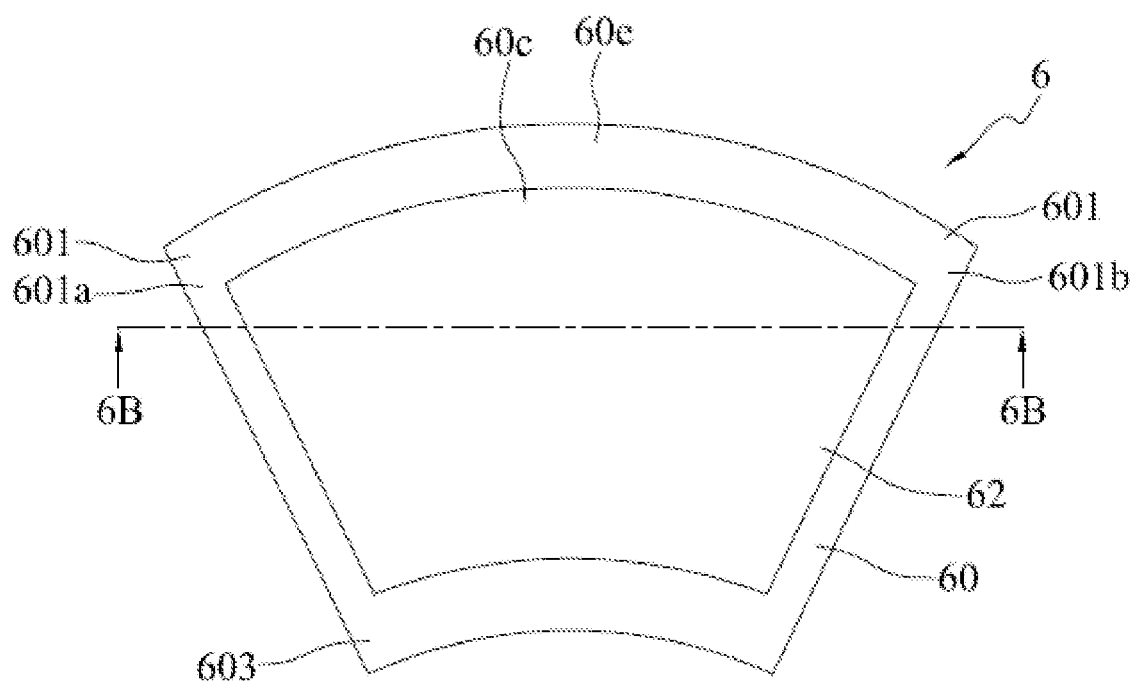
Figure 7B:
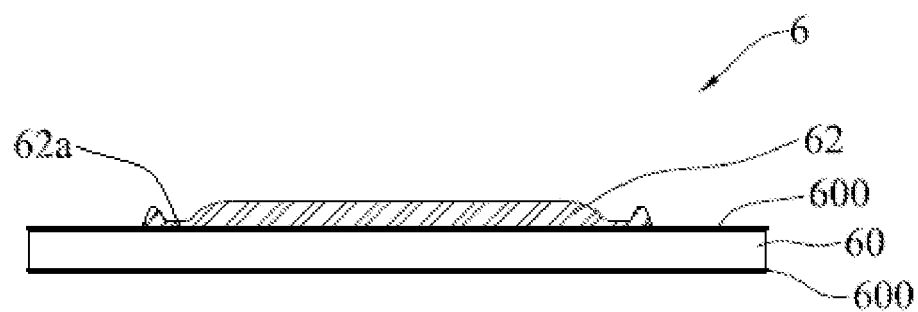
Figure 8A:
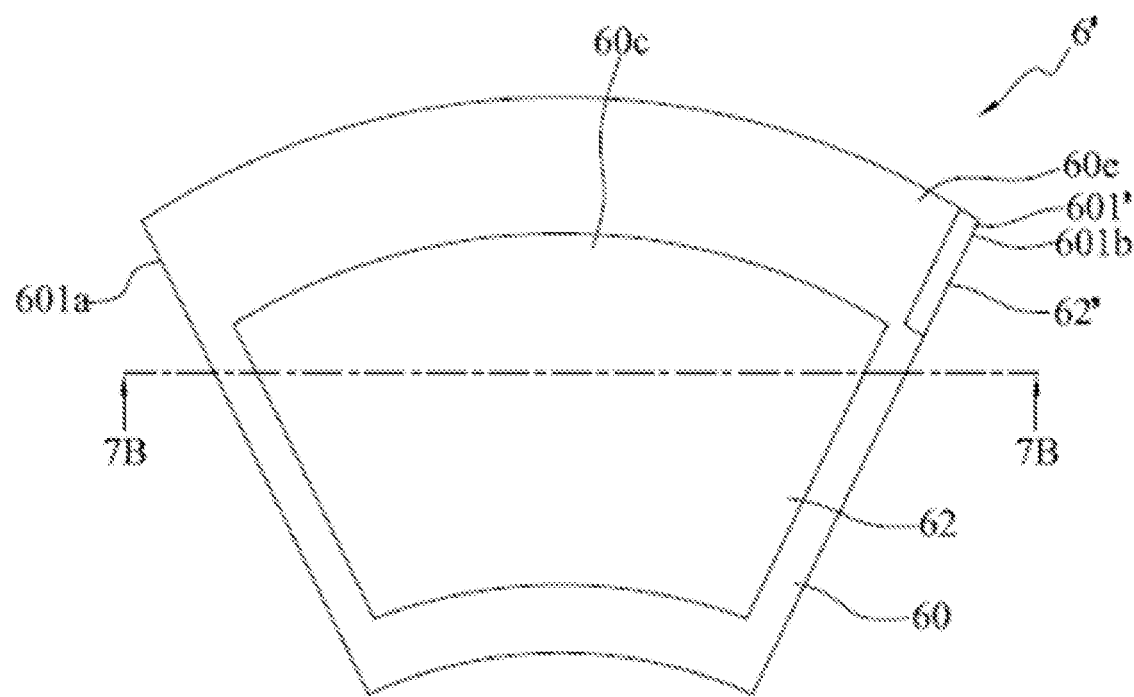
Figure 8B:
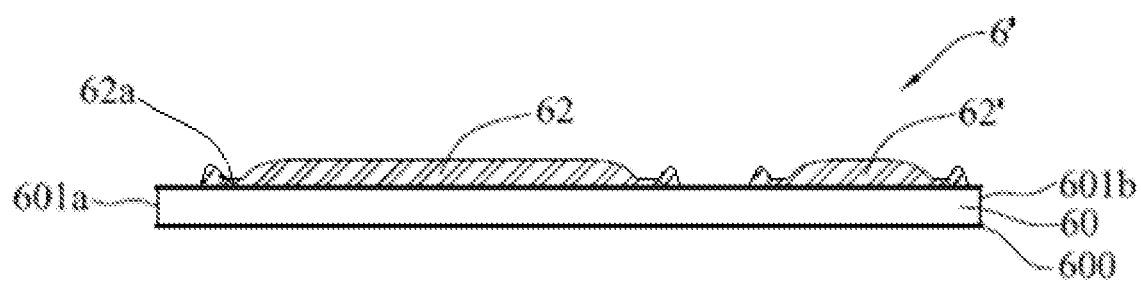

Referring to FIGS. 7A and 7B, a schematic view and a cross-sectional view of a laminated structure for making a heat-retaining container according to the present disclosure are shown.

As shown in FIGS. 7A and 7B, a laminated structure 6 for making a heat-retaining container according to the present disclosure includes a paper-based layer 60, a polymer layer 600 and a foamed sheet 62.

In an embodiment, the surface of the paper-based layer 60 is defined with a central region 60c and a peripheral region 60e surrounding the central region 60c; the polymer layer 600 at least formed in the central region 60c and in proximity to the peripheral region 60e (in an embodiment, the entire two surfaces of the paper-based layer 60 are covered with the polymer layer 600); and the foamed sheet 62 partially adhered to the central region 60c of the paper-based layer 60, wherein areas of the foamed sheet 62 in the central region 60c in proximity to the peripheral region 60e and the polymer layer 600 are melted together, such that the foamed sheet 62 is partially adhered to the central region 60c of the paper-based layer 60. The area of the foamed sheet 62 is approximately the same as that of the central region 60c.

In an embodiment, the peripheral region 60e includes a rolling portion 601 and a bottom edge portion 603 opposite to each other and a first overlapping portion 601a and a second overlapping portion 601b opposite to each other. The first overlapping portion 601a and the second overlapping portion 601b are connected at two ends of the rolling portion 601 and the bottom edge portion 603. The rolling portion 601 will be rolled in to form the cup rim during a paper container manufacturing process. In another embodiment of the present disclosure, a gap exists in an area where the rolling portion 601 and the second overlapping portion 601b are adjacent to each other (not shown). As a result, the length of the second overlapping portion 601b is less than that of the first overlapping portion 601a. This is beneficial in that when the first overlapping portion 601a and the second overlapping portion 601b are overlapped with each other, the portion of the first overlapping portion 601a connected to the rolling portion 601 will not overlap the second overlapping portion 601b, thereby avoiding thickness difference at the overlapping area of the paper container.

In an embodiment, the polymer layer 600 is formed on two opposite surfaces of the paper-based layer 60. In another embodiment, the foamed sheet is formed of a material of the polymer layer. In an embodiment, the polymer layer is made of polyethylene (PE), and the foamed sheet is a material containing PE, such as Expandable PE (EPE). In another embodiment, the polymer layer is made of poly-propylene (PP), and the foamed sheet is a material containing PP, such as Expandable PP (EPP). In an embodiment, the polymer layer is a waterproof layer, and the waterproof layer is PE.

In an embodiment, the paper-based layer 60 is made of paper, and the foamed sheet is made of Expandable Polystyrene (EPS), Expandable Polyethylene (EPE) or Expandable Poly-Propylene (EPP), but they are not limited as such.

In an embodiment, an edge 62a of the foamed sheet 62 corresponding to the central region 60c of the paper-based layer 60 in proximity to the peripheral region 60e is formed by thermal lamination (referring to FIG. 7B). The polymer layer 600 and the foamed sheet 62 at the edge 62a are bonded together.

In an embodiment, the edge 62a of the foamed sheet 62 is flat, the edge 62a corresponding to the tear line (not shown) includes broken bubbles, and an open-cell foam structure is formed.

Referring to FIGS. 8A to 8D, an implementation of another laminated structure 6' for making a heat-retaining container according to the present disclosure is shown. In an area where the rolling portion 601' is connected with the second overlapping portion 601b, a leveling component 62' is formed on the paper-based layer 60 or the polymer layer 600. The leveling component 62' can be a foamed sheet or other thermal plastic or thermal setting material. In an embodiment, the stamping unit 41 is laminating the foamed sheet in the central region 60c, and the leveling component 62' is formed by laminating another foamed sheet on the connecting or intersecting area between the rolling portion 601' and the second overlapping portion 601b of the peripheral region 60e as the leveling component 62'. In another embodiment, the leveling component can be separately formed in the shape of a sheet or a block, and can be made of the same or different material from the material of the foamed sheet 62.

Figure 9A:
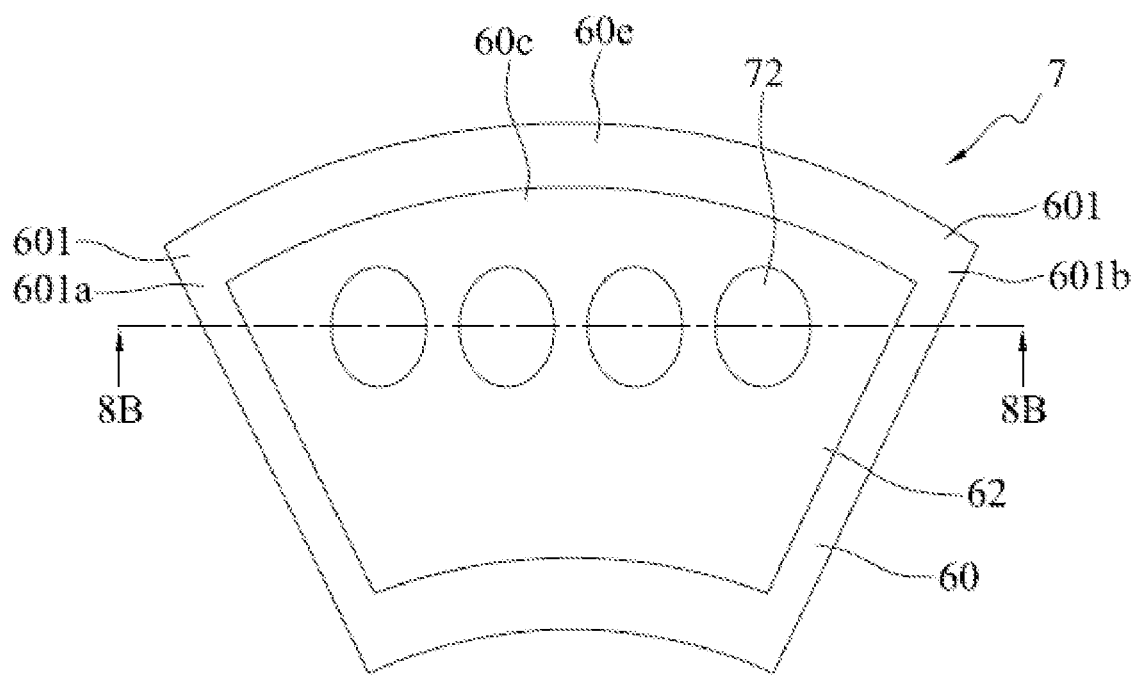
Figure 9B:
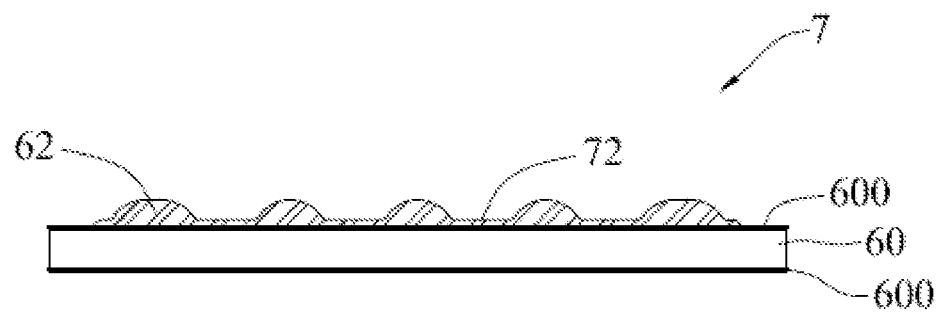

Referring to FIGS. 9A and 9B, an implementation of another laminated structure 7 for making a heat-retaining container according to the present disclosure is shown. In the central region 60c, portions of the foamed sheet are melted with the polymer layer, forming depressed portions 72 (concave ribs) on the foamed sheet 62. The depressed portions 72 include, but are not limited to, geometric shapes, arcs or a specific shape to enhance the grip of the heat-retaining container made from the laminated structure 7.

In an embodiment, the depressed portions 72 can be formed in the central region 60c simultaneously or at a different time to the lamination of the foamed sheet by the stamping unit 41. When the tool further includes another press portion, the depressed portions 72 can be formed while laminating the foamed sheet. Of course, the depressed portions 72 can be separately formed.

Referring to FIGS. 5A to 5C again, in a method for manufacturing a laminated structure of a heat-retaining container, contacting a foamed material sheet 51 placed on a paper substrate 50 with a stamping unit 41 comprising a tool of the invention, and moving the tool downward towards the paper substrate 50 to press a foamed material laminate 511 onto the paper substrate 50. The tool, including a press portion and blade portion, is heated to a temperature enough to press the foamed material laminate 511 onto the paper substrate 50 by the press portion as well as to cut the foamed material sheet 51 by melting by the blade portion.

To press the foamed material laminate 511 onto the paper substrate 50, a tool of the present invention is moved downward towards the paper substrate 50, and press the contacting part 511*a* of the foamed material sheet 51 towards the paper substrate 50.

Preferably, the tool is moved downward towards the paper substrate 50 by a distance equal to a thickness of the foamed material sheet 51 to effectively press the foamed material laminate 511 onto the paper substrate 50 as well as to cut the foamed material sheet 51 by melting, without damaging the paper substrate 50 below.

A laminated structure prepared by a method of the invention comprises a paper substrate 50, and a foamed material laminate 511 partially adhered to the paper substrate 50. In particular, such laminated structure has a characteristic structure, namely, a protrusion 511*c* formed at a periphery of the foamed material laminate 511.

It can be seen from the above embodiments that the tool according to the present disclosure includes both a blade portion and a press portion, which allows the foamed sheet to be cut while pressure and heat are applied to it, so it is partially melted with the polymer layer (e.g., a waterproof layer) on the paper, and thus adhering (laminating) the foamed sheet on the paper at the same time.

Not only that, in the laminated structure for making a heat-retaining container of the present disclosure, by partially adhering the foamed sheet onto the central region of the paper-based layer, the peripheral region of the laminated structure for making a heat-retaining container only has the thickness of the paper-based layer itself or plus the thickness of the polymer layer, so it is not affected by the thickness of the foamed sheet, and the heat-retaining container can be processed by a standard paper container processing machine.

Moreover, as the foamed sheet is only partially adhered onto the paper-based layer, when the container is being recycled, the foamed sheet can be easily peeled off to achieve separation of the paper-based layer and the foamed sheet, greatly enhancing the convenience of resource recycling.

Furthermore, the leveling component is provided at the intersection of the rolling portion and the second overlapping portion, so when overlapping and rolling processes are subsequently carried out by the paper container processing machine, the heat of the processing will lightly melt or soften the leveling component, which overflows beyond the intersection of the rolling portion and the first and second overlapping portions, thus avoiding thickness difference of the paper container. In addition to the above structure, the present disclosure also proposes the formation of a gap at an area where the rolling portion and the second overlapping portion are adjacent to each other, thus avoiding thickness difference at the overlapping area of a conventional paper container, improving the sealing of a sealing film applied to the top opening of the container with liquid inside.

Additionally, the present disclosure also improves the grip of heat-retaining container made from the laminated structure according to the present disclosure by allowing the formation of the depressed portions in geometric, arc or specific shapes on the central region.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A stamping unit for pressing a foamed material onto a substrate, comprising:
   a tool, including:
      a body, having an upper side and a lower side;
      a blade portion extending in a lengthwise direction from the lower side of the body; and
      a press portion extending in the lengthwise direction from the lower side of the body and configured for pressing the foamed material onto the substrate;
      wherein the blade portion and the press portion are fixedly disposed to the body, and the blade portion and the press portion are spaced apart; and
   a heater, disposed to the body of the tool, so as to heat the tool.

2. The stamping unit of claim 1, wherein the press portion has a width between 0.5 mm and 20 mm.

3. The stamping unit of claim 1, wherein the blade portion has a width between 0.1 mm to 2 mm.

4. The stamping unit of claim 1, wherein the blade portion and the press portion each include a distal end away from the body, with a gap formed between the two distal ends.

5. The stamping unit of claim 4, wherein the gap is between 0.5 mm to 10 mm.

6. The stamping unit of claim 4, wherein the gap is between ¼ and 2 times a thickness of the foamed material.

7. The stamping unit of claim 1, wherein the press portion includes a beveled or curved face extending from its distal end towards the body.

8. The stamping unit of claim 1, wherein the blade portion has a first ring structure, and the press portion is configured inside the first ring structure and has a second ring structure.

9. An apparatus for manufacturing a laminated structure of a heat-retaining container, comprising:
   a transport unit configured for supporting and transporting a paper substrate and a foamed material sheet placed on the paper substrate; and
   a stamping unit including: according to claim 1, wherein the tool is disposed above the transport unit;
   wherein the press portion and the blade portion face the foamed material sheet, the press portion being configured to contact a part of the foamed material sheet to press a foamed material laminate onto the paper substrate, and the blade portion being configured to contact a surrounding of the part of the foamed material sheet to cut the foamed material sheet by melting.

10. The apparatus of claim 9, further comprising a winding unit disposed at a downstream side in a transport direction of the transport unit, and configured for removing a rest part of the foamed material sheet not pressed onto the paper substrate.

11. The apparatus of claim 9, further comprising a cutting unit disposed at a downstream side in a transport direction of the transport unit, and configured for cutting the paper substrate to obtain the laminated structure, with the foamed material laminate partially adhered to a central region of the laminated structure.

12. The apparatus of claim 9, wherein the tool further includes a second press portion.

13. The apparatus of claim 9, wherein the stamping unit is a plane die-cutting machine or a rotary die-cutting machine.

* * * * *